United States Patent
Hwang

(10) Patent No.: US 12,452,659 B2
(45) Date of Patent: Oct. 21, 2025

(54) METHOD AND APPARATUS FOR GUARANTEEING TRUST OF PACKET IN DISTRIBUTED COMMUNICATION SYSTEM

(71) Applicant: Electronics and Telecommunications Research Institute, Daejeon (KR)

(72) Inventor: Hyun Gu Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 812 days.

(21) Appl. No.: 17/679,666

(22) Filed: Feb. 24, 2022

(65) Prior Publication Data

US 2022/0272529 A1      Aug. 25, 2022

(30) Foreign Application Priority Data

Feb. 25, 2021   (KR) .................. 10-2021-0025890
Jan. 7, 2022    (KR) .................. 10-2022-0002803

(51) Int. Cl.
  *H04M 1/66*      (2006.01)
  *H04W 12/041*    (2021.01)
  *H04W 12/0431*   (2021.01)

(52) U.S. Cl.
  CPC ..... *H04W 12/0431* (2021.01); *H04W 12/041* (2021.01)

(58) Field of Classification Search
  CPC ... H04W 12/06; H04W 12/069; H04W 12/12; H04W 12/041; H04W 12/0431; H04W 12/66; H04W 12/55; H04L 63/065
  See application file for complete search history.

(56) References Cited

U.S. PATENT DOCUMENTS

| 8,732,464 B2 * | 5/2014 | Lai ................. H04L 9/3263 713/168 |
| 9,858,822 B1 | 1/2018 | Gentry |
| 9,870,710 B2 | 1/2018 | Song et al. |
| 9,933,780 B2 | 4/2018 | Chau et al. |
| 2005/0129236 A1 * | 6/2005 | Sharma .............. H04L 63/08 380/259 |
| 2010/0287402 A1 | 11/2010 | Kim et al. |

(Continued)

FOREIGN PATENT DOCUMENTS

| KR | 10-2006-0071287 | 6/2006 |
| KR | 10-2010-0122045 | 11/2010 |

(Continued)

*Primary Examiner* — Shantell L Heiber
(74) *Attorney, Agent, or Firm* — KILE PARK REED & HOUTTEMAN PLLC

(57) ABSTRACT

An operation method of a first communication node in a wireless distributed communication system may comprise: providing a group code and a primary secret key to a third communication node via a second communication node; receiving, from the third communication node, a first packet including a first group trust field through wireless distributed communication, the first group trust field being generated using the group code and the primary secret key; and performing a trustworthiness check of the received first packet by using the first group trust field included in the received first packet, the group code, and the primary secret key.

7 Claims, 9 Drawing Sheets

(56) References Cited

U.S. PATENT DOCUMENTS

| | | | |
|---|---|---|---|
| 2015/0264658 A1 | 9/2015 | Kwak et al. | |
| 2016/0135045 A1* | 5/2016 | Lee ..................... | H04L 9/0833 |
| | | | 726/9 |
| 2017/0309191 A1 | 10/2017 | Marcus | |
| 2018/0222582 A1 | 8/2018 | Ohata et al. | |
| 2019/0098104 A1 | 3/2019 | Kim et al. | |
| 2019/0387401 A1* | 12/2019 | Liao ..................... | H04W 4/08 |
| 2021/0084044 A1 | 3/2021 | Choyi et al. | |
| 2022/0237329 A1* | 7/2022 | Dahiya ................. | G06F 21/79 |

FOREIGN PATENT DOCUMENTS

| | | |
|---|---|---|
| KR | 10-2012-0052404 | 5/2012 |
| KR | 10-2015-0024117 | 3/2015 |
| KR | 10-2019-0101305 | 8/2019 |
| KR | 10-2020-0099873 | 8/2020 |

* cited by examiner

METHOD AND APPARATUS FOR GUARANTEEING TRUST OF PACKET IN DISTRIBUTED COMMUNICATION SYSTEM

CROSS-REFERENCE TO RELATED APPLICATIONS

This application claims priority to Korean Patent Applications No. 10-2021-0025890 filed on Feb. 25, 2021 and No. 10-2022-0002803 filed on Jan. 7, 2022 with the Korean Intellectual Property Office (KIPO), the entire contents of which are hereby incorporated by reference.

BACKGROUND

1. Technical Field

The present disclosure relates to a technique for guaranteeing trust of packets in a distributed communication system, and more particularly, to a technique for guaranteeing trust of packets in a distributed communication system, which can secure trust of packets by sharing a secret key between terminals.

2. Related Art

A wireless distributed communication system may be a system in which terminals autonomously perform communications by sharing radio resources without a control station. In such the wireless distributed communication system, it may be difficult to ensure trust of distributed packets. In order to solve this problem, according to the prior arts, the wireless distributed communication system may use an open trust communication scheme. Here, the open trust communication scheme may be a communication scheme using open trust packets. In addition, the open trust packet may be a distributed packet including an open trust field (OTF) that can confirm trustworthiness. Accordingly, a terminal can verify a trustworthiness of a received open trust packet by providing a field value of the open trust field to a designated trusted authority of the wireless distributed communication system. In this manner, the terminal can verify the trustworthiness of the distributed packet through the trusted authority.

In the wireless distributed communication system using such the open trust communication scheme, only the trusted authority designated in advance can perform the trustworthiness check. Accordingly, in the wireless distributed communication system using the open trust communication scheme, terminals that are not designated as the trusted authority cannot perform trustworthiness checks on open trust packets. Accordingly, there may be a need for a method of confirming the trustworthiness of packets exchanged between terminals in the wireless distributed communication system. In particular, it may be necessary for terminals to verify trustworthiness of packets without assistance of the trusted authority.

SUMMARY

In order to solve the above-identified problems, exemplary embodiments of the present disclosure are directed to providing a method and an apparatus for guaranteeing trust of packets in a distributed communication system, which can secure trust of packets by sharing a secrete key between terminals.

According to a first exemplary embodiment of the present disclosure for achieving the above-described objective, an operation method of a first communication node in a wireless distributed communication system may comprise: providing a group code and a primary secret key to a third communication node via a second communication node; receiving, from the third communication node, a first packet including a first group trust field through wireless distributed communication, the first group trust field being generated using the group code and the primary secret key; and performing a trustworthiness check of the received first packet by using the first group trust field included in the received first packet, the group code, and the primary secret key.

The operation method may further comprise: receiving, from the third communication node, first position information of the third communication node together with the first group trust field; determining whether the third communication node has entered an entry restricted area based on the first position information; and in response to determining that the third communication node has entered the entry restricted area, permitting the third communication node to enter the entry restricted area when a trustworthiness of the first packet is confirmed.

The operation method may further comprise: generating a secondary secret key by updating the primary secret key; providing the secondary secret key to the third communication node via the second communication node; receiving, from the third communication node, a second packet including a second group trust field generated using the group code and the secondary secret key; and performing a trustworthiness check of the received second packet by using the second group trust field included in the received second packet, the group code, and the secondary secret key.

The operation method may further comprise: receiving, from the second communication node, a secondary secret key updated based on the primary secret key; receiving, from the third communication node, a second packet including a second group trust field generated using the group code and the secondary secret key; and performing a trustworthiness check on the received second packet by using the second group trust field included in the received second packet, the group code, and the secondary secret key.

The operation method may further comprise: receiving, from the third communication node, second position information of the third communication node together with the second group trust field; determining whether the third communication node has entered an entry restricted area based on the second position information; and in response to determining that the third communication node has entered the entry restricted area, permitting the third communication node to enter the entry restricted area when a trustworthiness of the received second packet is confirmed.

The first group trust field may be generated based on the group code and the primary secret key by using a linear feedback shift register from the third communication node.

The operation method may further comprise: transmitting, to the third communication node, a signal prohibiting the third communication node to enter into the entry restricted area when the trustworthiness of the first packet is not confirmed as a result of the trustworthiness check; and transmitting, to the second communication node, a signal prohibiting the third communication node to enter into the entry restricted area.

According to a second exemplary embodiment of the present disclosure for achieving the above-described objective, an operation method of a second communication node in a wireless distributed communication system may comprise: receiving, from a first communication node, a first packet through wireless distributed communication, the first packet including a first specific code designating a third communication node, a first specific trust field used when the third communication node performs a trustworthiness check, and information on a requested operation to be performed by the second communication node and the third communication node; transmitting, to the third communication node, the received first packet and information on a reception time of the first packet; receiving, from the third communication node, an operation request according to the information on the requested operation included in the first packet; and performing an operation according to the operation request with the third communication node.

The operation method may further comprise, when the operation according to the operation request is completed, transmitting, to the first communication node, a second packet including information indicating a completion of the operation according to the operation request through wireless distributed communication.

The second packet may include a second specific trust field used when the first communication node performs trustworthiness check and information on a generation time of the second specific trust field, which are received from the third communication node.

In the transmitting of the received first packet and the information on the reception time of the first packet, a part of the first packet may be transmitted instead of the first packet to the third communication node, the part of the first packet including the first specific trust field used when the third communication node performs a trustworthiness check, the information on the requested operation to be performed by the second communication node and the third communication node, and an address of the first communication node.

According to a third exemplary embodiment of the present disclosure for achieving the above-described objective, a second communication node in a wireless distributed communication system may comprise: a processor; a memory electronically communicating with the processor; and instructions stored in the memory, wherein when executed by the processor, the instructions cause the second communication node to: receive, from a first communication node, a first packet through wireless distributed communication, the first packet including a first specific code designating a third communication node, a first specific trust field used when the third communication node performs a trustworthiness check, and information on a requested operation to be performed by the second communication node and the third communication node; transmit, to the third communication node, the received first packet and information on a reception time of the first packet; receive, from the third communication node, an operation request according to the information on the requested operation included in the first packet; and perform an operation according to the operation request with the third communication node.

The instructions may further cause the second communication node to, when the operation according to the operation request is completed, transmit, to the first communication node, a second packet including information indicating a completion of the operation according to the operation request through wireless distributed communication.

The second packet may include a second specific trust field used when the first communication node performs trustworthiness check and information on a generation time of the second specific trust field, which are received from the third communication node.

According to the present disclosure, in a wireless distributed communication system, a terminal may use a group trust field (GTF) to guarantee trustworthiness of a distributed packet. As a result, in the wireless distributed communication system, the terminal can perform a trustworthiness check on a distributed packet received from another terminal belonging to a group without assistance of a trusted authority. In addition, the terminal can perform an operation according to an operation request included in the distributed packet for which trustworthiness is secured. In addition, according to the present disclosure, in the wireless distributed communication system, the terminal may use a specific trust field (STF) to guarantee trustworthiness of a distributed packet. As a result, in the wireless distributed communication system, the terminal can perform a trustworthiness check on a distributed packet received from a specific terminal without assistance of a trusted authority. In addition, the terminal can perform an operation according to an operation request included in the distributed packet for which trustworthiness is secured.

DETAILED DESCRIPTION OF THE EMBODIMENTS

Figure 1:
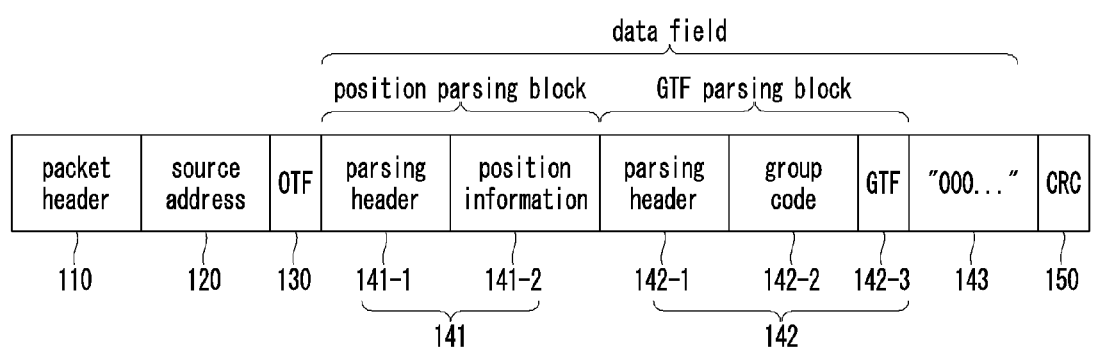
FIG. 1 is a block diagram illustrating a first exemplary embodiment of a distributed packet including a group trust field (GTF).

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

Meanwhile, a wireless distributed communication system may be a system in which terminals autonomously perform communications by sharing radio resources without a control station. In such the wireless distributed communication system, it may be difficult to ensure trust of distributed packets. In order to solve this problem, according to the prior arts, the wireless distributed communication system may use an open trust communication scheme. Here, the open trust communication scheme may be a communication scheme using open trust packets. In addition, the open trust packet may be a distributed packet including an open trust field (OTF) that can confirm trustworthiness. Accordingly, a terminal can verify a trustworthiness of a received open trust packet by providing a field value of the open trust field to a designated trusted authority of the wireless distributed communication system. In this manner, the terminal can verify the trustworthiness of the distributed packet through the trusted authority.

For example, such the open trust communication scheme may be used for communications between drones. In general, in the wireless distributed communication system, the open trust field may be designed to be non-replicable. In the wireless distributed communication system, the open trust field may be changed for every slot. In such the communication environment, an illegal drone may receive an open trust packet including an open trust field for the past slot(s).

In addition, the illegal drone may generate and transmit a new open trust packet by duplicating the open trust field included in the received open trust packet. Then, nearby terminals may receive the open trust packet including the duplicated open trust field from the illegal drone. In addition, the terminal may inquire about trustworthiness of the open trust packet received from the illegal drone to the trusted authority. In this case, since the trusted authority has received the open trust field for the past slot from the terminal, it may confirm to the terminal that the inquired packet is an unreliable packet.

In the wireless distributed communication system using such the open trust communication scheme, only the trusted authority designated in advance can perform the trustworthiness check. Accordingly, in the wireless distributed communication system using the open trust communication scheme, terminals that are not designated as the trusted authority cannot perform trustworthiness checks on open trust packets. Accordingly, there may be a need for a method of confirming the trustworthiness of packets exchanged between terminals in the wireless distributed communication system. In particular, it may be necessary for terminals to verify trustworthiness of packets without assistance of the trusted authority.

Here, the wireless distributed communication system may include not only terminals transmitting and receiving distributed packets, but also terminals supporting communication activities of these terminals. In such the wireless distributed communication system, two terminals may perform one-to-one communications. In this case, the terminals may perform reliable one-to-one communication through mutual registrations. However, the wireless distributed communication system may generally support a communication scheme of many-to-many communications. Therefore, in one-to-one communication, it may not be important to secure trustworthiness of packets. In addition, trust in the transmitted/received wireless distributed communication packet itself may be more important than confirming trust in the terminal.

FIG. 1 is a block diagram illustrating a first exemplary embodiment of a distributed packet including a group trust field (GTF).

Referring to FIG. 1, a distributed packet may include a packet header field 110, a source address field 120, an open trust field 130, a data field 140, and a cyclical redundancy check (CRC) field 150.

Here, the packet header field 110 may be a field used to indicate a packet type. In this case, the packet type may be, for example, a position broadcast packet. The terminal may indicate the position broadcast packet by using, for example, a hexadecimal value 0x0A in the packet header field 110. The source address field 120 may be a field for indicating a source address of the distributed packet. The terminal may transmit the packet by designating its own identifier (ID) in the source address field 120. In addition, the open trust field 130 may be a field that allows trustworthiness of the distributed packet to be confirmed through the trusted authority designated by the wireless distributed communication system.

Meanwhile, the data field 140 may include a position parsing block 141, a group trust field parsing block 142, and a general data field 143. Here, the position parsing block 141 may be a parsing block related to position information. The position parsing block 141 may include a first parsing header field 141-1 and a position information field 141-2. In this case, the first parsing header field 141-1 may be a field for indicating a property of information included in the position parsing field 141.

For example, the terminal may indicate that the position information field 141-2 including position information is continued by configuring the distributed packet to include a hexadecimal value 0x01 in the first parsing header field 141-1. Here, the position information field 141-2 may be a field indicating position information of the terminal. The terminal may broadcast its GPS coordinates by configuring the distributed packet to include, for example, global positioning system (GPS) coordinate information in the position information field 141-2.

The group trust field parsing block 142 may be a parsing block related to the group trust field. The group trust field parsing block 142 may include a second parsing header field 142-1, a group code field 142-2, and a group trust field 142-3. Here, the second parsing header field 142-1 may be a field for indicating a property of information included in the group trust parsing block 142. For example, the terminal may configure the distributed packet such that a hexadecimal value 0x02 is included in the second parsing header field 142-1 to indicate that the group code field 142-2 including a group code and the group trust field 142-3 including group trust bits are continued. Here, the group code field 142-2 may be a field for indicating the group code.

The group trust field 142-3 may refer to a field inserted into the distributed packet so that terminals belonging to a predetermined group can perform trustworthiness checks with each other in wireless distributed communication. The group trust field 142-3 may include group trust bits generated using the group code and a secret key. Here, the terminal may generate the group trust bits by using the group code, the secret key, and time information. Here, the time information means information on a transmission time of the distributed packet or a generation time of the distributed packet.

Alternatively, the terminal may generate the group trust bits by using the group code, the secret key, the time information, and a terminal identifier. The terminal may transmit the distributed packet including the group trust bits by designating the group trust bits in the group trust field 142-3.

Meanwhile, the general data field 140-3 may include data that the terminal needs to transmit. The terminal may transmit the distributed packet including the transmission time or generation time of the distributed packet by including the transmission time or generation time of the distributed packet in the general data field 140-3. The CRC field 150 may be a field for indicating a CRC to determine whether there is an error.

Meanwhile, terminals belonging to the same group may share the corresponding group code and may share the same secret key. Accordingly, any one terminal belonging to the same group may generate the group trust bits by using the group code and the secret key. In addition, any one terminal belonging to the same group may transmit a distributed packet including the group code and the group trust field composed of the generated group trust bits. Accordingly, other terminals belonging to the same group may receive the distributed packet from any one terminal.

In addition, another terminal belonging to the same group may perform a trustworthiness check on the group trust bits included in the received distributed packet by using the group code and the secret key. Here, terminals belonging to the same group may receive and share the group code and the secret key from a management authority. Alternatively, any one terminal belonging to the same group may generate the group code and the secret key, and transmit the generated group code and secret key to the management authority. Then, other terminals belonging to the same group may receive and share the group code and the secret key from the management authority.

Meanwhile, a nuclear power plant server that manages a nuclear power plant facility may prohibit drones from flying close to the nuclear power plant facility. However, the nuclear power plant server may utilize drones for observation of the nuclear power plant facility. To this end, the nuclear power plant server may need to allow some drones to fly close to the nuclear power plant facility. In addition, the nuclear power plant server may need to allow some drones to fly close to the nuclear power plant facility for other reasons. In this case, the nuclear power plant server may provide the group code and the secret key to some drones. In addition, the nuclear power plant server may receive, from a drone, group trust bits generated using the group code and the secret key, and determine whether to permit flight thereof.

Figure 2:
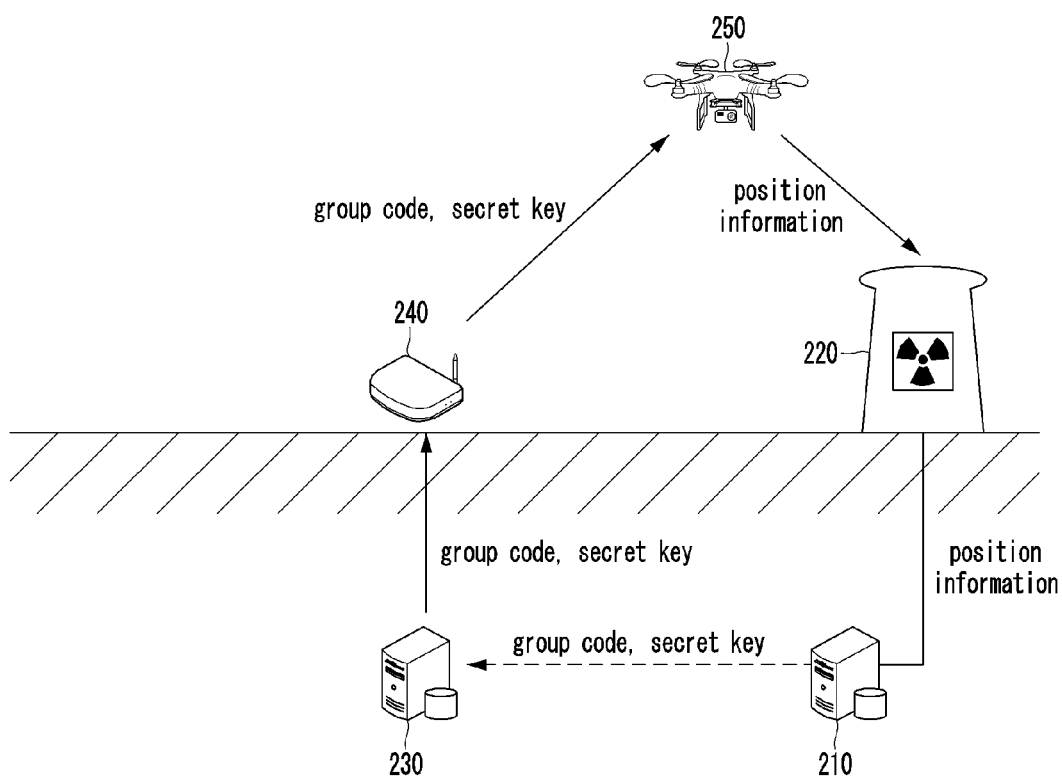
FIG. 2 is a conceptual diagram illustrating a first exemplary embodiment of an apparatus for guaranteeing trust of packets.

FIG. 2 is a conceptual diagram illustrating a first exemplary embodiment of an apparatus for guaranteeing trust of packets.

Referring to FIG. 2, an apparatus for guaranteeing trust of packets may include a nuclear power plant server 210, a nuclear power plant transceiver 220, a flight permission approval server 230, a drone controller 240, and a drone 250. In such the apparatus for guaranteeing trust of packets, the nuclear power plant server 210 may manage the nuclear power plant facility, and may manage a group code and a primary secret key. The nuclear power plant server 210 may provide the group code and the primary secret key to the flight permission approval server 230.

In addition, the nuclear power plant server 210 may inform the flight permission approval server 230 about a scheme of generating group trust bits (i.e., group trust field) using the group code and the primary secret key. As an example, as the scheme of generating group trust bits using the group code and the primary secret key, a scheme of using a linear feedback shift register (LFSR) may be used. In general, the drone 250 may use a transmission time or generation time of a packet together when generating group trust bits in order to generate a different trust field for every slot.

Accordingly, the nuclear power plant server 210 may inform the flight permission approval server 230 about a scheme of generating group trust bits using the group code, the primary secret key, and the transmission time. As an example, as a scheme of generating group trust bits using the group code, the primary secret key, and the transmission time, a scheme of using a linear feedback shift register may be used. The scheme of generating group trust bits may be previously agreed upon between the nuclear power plant server 210 and the drone 250. In this case, the drone 250 may store and manage the scheme of generating group trust bits. Accordingly, the nuclear power plant server 210 may not inform the drone 250 of information about the scheme of generating group trust bits.

In addition, the drone 250 may additionally further use a drone identifier when generating group trust bits. Accordingly, the nuclear power plant server 210 may inform the flight permission approval server 230 of the group code, the primary secret key, the transmission time, the drone identifier, and the scheme of generating group trust bits. As an example, the scheme of generating group trust bits by using the group code, the primary secret key, the transmission time, and the drone identifier may include a scheme using a linear feedback shift register.

In addition, the nuclear power plant server 210 may receive a distributed packet including at least one of the group code, group trust bits, and position information from the drone 250 by using the nuclear power plant transceiver 220. Accordingly, the nuclear power plant server 210 may obtain the position information of the drone 250 from the received distributed packet. In addition, the nuclear power plant server 210 may determine whether the drone 250 is located in an entry restricted area of the nuclear power plant. As a result of the determination, if the drone 250 is located in the entry restricted area of the nuclear power plant, the nuclear power plant server 210 may perform a trustworthiness check on the distributed packet including the position information, which is received from the drone 250. In this case, the nuclear power plant server 210 may obtain the group code from the distributed packet received from the drone 250.

In addition, the nuclear power plant server 210 may determine whether the obtained group code is the same as the group code transmitted to the flight permission approval server 230. As a result of the determination, if the group codes are the same, the nuclear power plant server 210 may generate group trust bits by using the group code and the primary secret key based on the scheme of generating group trust bits informed to the flight permission approval server 230. In this case, the nuclear power plant server 210 may additionally use at least one of the transmission time and the drone identifier to generate the group trust bits. In addition, the nuclear power plant server 210 may determine whether the generated group trust bits are the same as the group trust bits included in the distributed packet received from the drone 250. The nuclear power plant server 210 may confirm that the distributed packet is trusted if the generated group trust bits are the same as the group trust bits received from the drone 250.

As described above, when the nuclear power plant server 210 confirms the trustworthiness of the distributed packet (i.e., when the distributed packet passes the trustworthiness check), it may transmit a flight permission message to the flight permission approval server 230 to permit the drone 250 to fly in the entry restricted area. In addition, when the trustworthiness of the received distributed packet is confirmed, the nuclear power plant server 210 may transmit a flight permission message to the drone 250 through the nuclear power plant transceiver 220 to permit the flight of the drone 250. Here, the entry restricted area of the nuclear power plant may be a certain area located above the nuclear power plant facility, and may be an area in which flying of unauthorized drones is prohibited in order to protect the nuclear power plant facility.

On the other hand, when the trustworthiness of the received distributed packet is not confirmed according to the result of performing the trustworthiness check on the distributed packet received from the drone 250, the nuclear power plant server 210 may transmit a flight prohibition message to the flight permission approval server 230 to disallow flight of the drone 250. In addition, when the trustworthiness of the received distributed packet is not confirmed according to the result of performing the trustworthiness check on the distributed packet received from the drone 250, the nuclear power plant server 210 may transmit a flight prohibition message to the drone 250 through the nuclear power plant transceiver 220 to disallow flight of the drone 250. In this case, the nuclear power plant server 210 may transmit a dispatch request message to a police station server to prevent illegal intrusion of the drone 250.

Alternatively, after the nuclear power plant server 210 first performs the trustworthiness check of the distributed packet transmitted by the drone 250, it may be determined whether the drone 250 is located in the entry restricted area of the nuclear power plant. In this case, when the trustworthiness of the distributed packet is confirmed and the drone 250 is located in the entry restricted area of the nuclear power plant, the nuclear power plant server 210 may transmit a flight permission message to the flight permission approval server 230 to permit flight of the drone 250. In addition, the nuclear power plant server 210 may transmit a flight permission message to the drone 250 through the nuclear power plant transceiver 220 to permit the flight of the drone 250. On the other hand, the nuclear power plant server 210 may disallow the flight of the drone 250 by transmitting a flight prohibition message to the flight authorization approval server 230 when the trustworthiness of the distributed packet is not confirmed. In addition, the nuclear power plant server 210 may disallow the flight of the drone 250 by transmitting a flight prohibition message to the drone 250 through the nuclear power plant transceiver 220.

On the other hand, the flight permission approval server 230 may receive the group code and the primary secret key from the nuclear power plant server (240). In addition, the flight permission approval server 230 may receive information on the scheme of generating group trust bits from the nuclear power plant server 240. In addition, the flight permission approval server 230 may transmit the received group code and primary secret key to the drone controller 240. In addition, the flight permission approval server 230 may transmit information on the scheme of generating group trust bits to the drone controller 240.

In addition, the flight permission approval server 230 may receive a flight permission message from the nuclear power plant server 240 when the nuclear power plant server 240 permits the flight of the drone 250. In addition, the flight permission approval server 230 may transmit the received flight permission message to the drone controller 240. Alternatively, the flight permission approval server 230 may receive a flight prohibition message from the nuclear power plant server 240 when the nuclear power plant server 240 does not permit the flight of the drone 250. In addition, the flight permission approval server 230 may transmit the received flight prohibition message to the drone controller 240.

Then, the drone controller 240 may control the flight of the drone 250 by a user's manipulation. In this case, the drone controller 240 may receive the group code and the primary secret key from the flight permission approval server 230. In addition, the drone controller 240 may receive information on the scheme of generating group trust bits from the flight permission approval server 230. In addition, the drone controller 240 may transmit the received group code and primary secret key to the drone 250.

In addition, the drone controller 240 may transmit information on the scheme of generating group trust bits to the drone 250. When the scheme of generating group trust bits is promised in advance, information on the generation scheme may not be transmitted. Meanwhile, the drone controller 240 may receive the flight permission message from the flight permission approval server 230 to inform the user of the flight permission. Of course, the drone controller 240 may receive the flight prohibition message from the flight permission approval server 230 to notify the user of the non-flight permission.

Meanwhile, the drone 250 may fly around the nuclear power plant according to control signals of the drone controller 240. In this case, the drone 250 may receive the group code and the primary secret key from the drone controller 240. The drone 250 may receive information on the scheme of generating group trust bits from the drone controller 240. In addition, the drone 250 may generate group trust bits by using the received group code and primary secret key. In this case, the drone 250 may use the transmission time when generating the group trust bits. The drone 250 may additionally use the drone identifier when generating the group trust bits.

Thereafter, the drone 250 may generate a distributed packet including at least one of a source address (i.e., drone identifier), position information, group code, group trust bits, transmission time, or a combination thereof. In addition, the drone 250 may transmit the generated distributed packet including the position information to the nuclear power plant server 210. Then, the nuclear power plant server 210 may receive the distributed packet including at least one of the group code, group trust bits, position information, and transmission time from the drone 250 by using the nuclear power plant transceiver 220. Accordingly, the nuclear power plant server 210 may obtain the position information of the drone 250 from the received distributed packet. In addition, the nuclear power plant server 210 may determine whether the drone 250 is located in the entry restricted area of the nuclear power plant. As a result of the determination, if the drone 250 is located in the entry restricted area of the nuclear power plant, the nuclear power plant server 210 may perform a trustworthiness check on the distributed packet including the position information received from the drone 250. In this case, when the nuclear power plant server 210 confirms the trustworthiness of the distributed packet (i.e., when the distributed packet passes the trustworthiness check), it may transmit the flight permission message to the drone 250 to permit the flight of the drone 250. Accordingly, the drone 250 may receive the flight permission message from the nuclear power plant server 210. In addition, the drone 250 may transmit the received flight permission message to the drone controller 240. On the other hand, the nuclear power plant server 210 may transmit a flight prohibition message to the drone 250 through the nuclear power plant transceiver 220 to disallow the flight of the drone 250 when the trustworthiness check performed on the distributed packet received from the drone 250 is not successful. Accordingly, the drone 250 may receive the flight prohibition message from the nuclear power plant server 210. In addition, the drone 250 may transmit the received flight prohibition message to the drone controller 240.

As described above, the distributed packet may have the open trust field and the group trust field. In this case, an operator who operates the wireless distributed communication system may use the open trust field to confirm the trustworthiness of the distributed packet. In addition, the nuclear power plant server 210 may use the group trust field to confirm legal flights of surrounding drones.

In this case, as described above, the nuclear power plant server 210 may change the primary secret key over time to generate and use a secondary secret key to increase the security of the secret key. The drone 250 may broadcast a distributed packet almost once every second. Accordingly, a malicious terminal may continuously receive these distributed packets for a long time. Then, the malicious terminal may use the primary secret key of the distributed packet.

Accordingly, if the nuclear power plant server 210 periodically changes the primary secret key, the security can be further improved. However, the nuclear power plant server 210 may transmit the changed secondary secret key again to the flight permission approval server 230. Accordingly, the flight permission approval server 230 may update the secret key by receiving the changed secondary secret key. In addition, the flight permission approval server 230 may provide the updated secondary secret key to the drone controller 240.

Accordingly, the drone controller 240 may receive the updated secondary secret key from the flight permission approval server 230. In addition, the drone controller 240 may provide the received secondary secret key to the drone 250. Accordingly, the drone 250 may broadcast position information by generating a distributed packet using the updated secondary secret key.

Here, the nuclear power plant server 210 may be configured to generate the secondary secret key and provide it to the flight permission approval server 220. However, unlike this, the flight permission approval server may generate the secondary secret key by using the primary secret key, and may be implemented to provide the generated secondary secret key to the nuclear power plant server 210 and the drone 250. The operation of the apparatus for guaranteeing trust of packets will be described with reference to FIG. 3 as follows.

Figure 3:
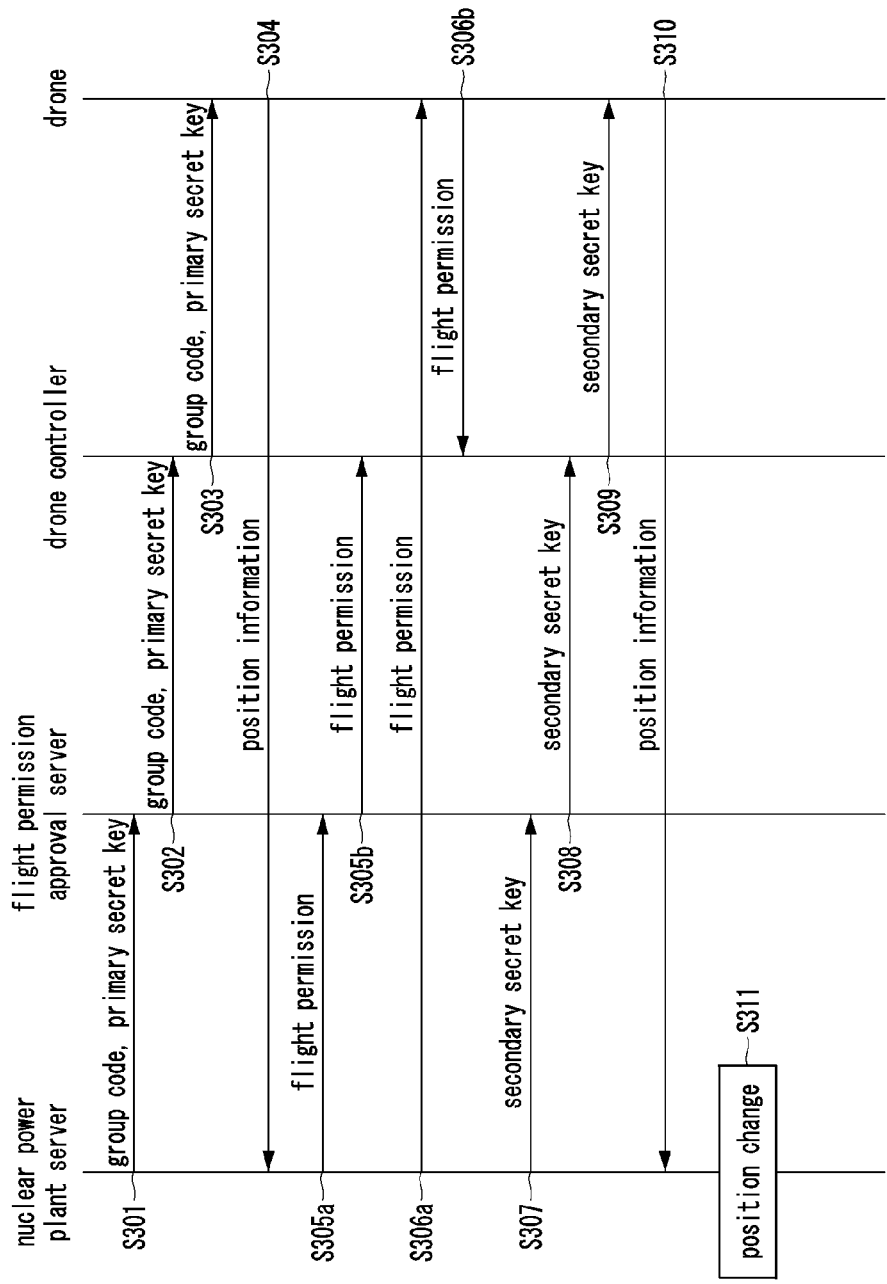
FIG. 3 is a sequence chart illustrating a first exemplary embodiment of a method for guaranteeing trust of packets.

FIG. 3 is a sequence chart illustrating a first exemplary embodiment of a method for guaranteeing trust of packets.

Referring to FIG. 3, in a method for guaranteeing trust of packets, the nuclear power plant server may transmit the group code and the primary secret key to the flight permission approval server (S301). In this case, the nuclear power plant server may inform the scheme of generating group trust bits using the group code and the primary secret key to the flight permission approval server. Then, the flight permission approval server may receive the group code and the primary secret key from the nuclear power plant server. In addition, the flight permission approval server may receive information on the scheme of generating group trust bits using the group code and the primary secret key from the nuclear power plant server.

Then, the flight permission approval server may transmit the group code and the primary secret key to the drone controller (S302). In this case, the flight permission approval server may inform the drone controller about the scheme of generating group trust bits using the group code and the primary secret key. Then, the drone controller may receive the group code and the primary secret key from the flight permission approval server. In addition, the drone controller may receive information on the scheme of generating group trust bits using the group code and the primary secret key from the flight permission approval server.

Accordingly, the drone controller may transmit the group code and the primary secret key to the drone (S303). Also, the drone controller may transmit information on the scheme of generating group trust bits using the group code and the primary secret key to the drone. Then, the drone may receive the group code and the primary secret key from the drone controller. In addition, the drone may receive information on the scheme of generating group trust bits using the group code and the primary secret key from the drone controller. Thereafter, the drone may generate group trust bits based on the scheme of generating group trust bits using the group code and the primary secret key.

In this case, the drone may use the transmission time when generating group trust bits. In addition, the drone may further use the drone identifier when generating the group trust bits. Then, the drone may generate a distributed packet including at least one or more of a source address, position information, group code, group trust bits, transmission time, or a combination thereof. In addition, the drone may transmit the generated distributed packet to the nuclear power plant transceiver. Then, the nuclear power plant transceiver may receive the distributed packet including the position information from the drone. In addition, the nuclear power plant transceiver may transmit the distributed packet including the position information to the nuclear power plant server.

Then, the nuclear power plant server may receive the distributed packet including the position information, the group code, and the group trust bits from the nuclear power plant transceiver (S304). In this case, the nuclear power plant server may obtain the position information of the drone from the distributed packet. In addition, the nuclear power plant server may determine whether the drone is located in an entry restricted area of the nuclear flight permission message to the flight permission approval server to permit the flight of the drone, when trustworthiness is confirmed by performing a trustworthiness check on the distributed packet including the position information received from the drone and the drone is located in the entry restricted area of nuclear power plant (S305*a*). In addition, the nuclear power plant server may obtain the position information of the drone and display the drone on a 3D map it has.

Accordingly, the flight permission approval server may receive the flight permission message from the nuclear power plant server, and the flight permission approval server may transmit the received flight permission message to the drone controller (S305*b*). Then, the drone controller may receive the flight permission message from the flight permission approval server. Thereafter, the drone controller may notify a user of the permission of the flight.

In addition, the nuclear power plant server may transmit the flight permission message to the drone through the nuclear power transceiver to permit the flight of the drone, when trustworthiness is confirmed by performing a trustworthiness check on a distributed packet received from the drone (S306*a*). Accordingly, the drone may receive the flight permission message from the nuclear power plant server, and the drone may transmit the received flight permission message to the drone controller (S306*b*). Then, the drone controller may receive the flight permission message from the drone. Thereafter, the drone controller may notify the user of the permission of the flight.

Here, the nuclear power plant server performs the trustworthiness check when the drone is located in the entry restricted area of the nuclear power plant. However, but unlike this, the nuclear power plant server may first perform the trustworthiness check of the distributed packet, and when the trustworthiness of the distributed packet is confirmed, the nuclear power plant server may determine whether the drone is located in the entry restricted area of the nuclear power plant. Thereafter, when the drone is located in the entry restricted area of the nuclear power plant as a result of the determination, the nuclear power plant server may transmit the flight permission message to the flight permission approval server to permit the flight of the drone. In addition, the nuclear power plant server may permit the flight by transmitting the flight permission message to the drone through the nuclear power plant transceiver. In this case, when the trustworthiness of the distributed packet is not confirmed, the nuclear power plant server may transmit a flight prohibition message to the flight permission approval server to disallow the flight of the drone. In addition, the nuclear power plant server may disallow the flight by transmitting the flight prohibition message to the drone through the nuclear power plant transceiver.

On the other hand, the nuclear power plant server may increase the security of the secret key by periodically generating and using a secondary secret key based on the primary secret key. Accordingly, the nuclear power plant server may periodically transmit the secondary secret key to the flight permission approval server (S307). Accordingly, the flight permission approval server may update the secret key by receiving the changed secondary secret key. Then, the flight permission approval server may provide the updated secondary secret key to the drone controller (S308).

Accordingly, the drone controller may receive the updated secondary secret key from the flight permission approval server. Then, the drone controller may provide the received secondary secret key to the drone (S309). Accordingly, the drone may broadcast position information by generating a distributed packet using the updated secondary secret key (S310). In this case, the drone may further use the transmission time when generating the group trust bits. In addition, the drone may further use the drone identifier when generating the group trust bits. Thereafter, the drone may generate a distributed packet including at least one of a source address, position information, group code, group trust bits, transmission time, or a combination thereof. In addition, the drone may transmit the generated distributed packet to the nuclear power plant transceiver, and the nuclear power plant transceiver may receive the distributed packet including the position information from the drone. In addition, the nuclear power plant transceiver may transmit the distributed packet including the position information to the nuclear power plant server.

Then, the nuclear power plant server may receive the distributed packet including the position information, the group code, and the group trust bits from the nuclear power plant transceiver. In this case, the nuclear power plant server may obtain the position information of the drone from the distributed packet. In addition, the nuclear power plant server may determine whether the drone is located in an entry restricted area of the nuclear power plant. As a result of the determination, if the drone is located in the entry restricted area of the nuclear power plant, the nuclear power plant server may perform a trustworthiness check on the distributed packet including the position information received from the drone, and when the trustworthiness is confirmed, may change the position of the drone on the 3D map (S311).

In addition, as a result of the determination, if the drone is located in the entry restricted area of the nuclear power plant, the nuclear power plant server may transmit a flight permission message to the flight permission approval server to permit the flight of the drone. In addition, the nuclear power plant server may permit the flight by transmitting the flight permission message to the drone through the nuclear power plant transceiver.

Here, the nuclear power plant server performs the trustworthiness check when the drone is identified as being located in the entry restricted area of the nuclear power plant. However, but unlike this, the nuclear power plant server may first perform the trustworthiness check on the distributed packet, and when the trustworthiness of the distributed packet is confirmed, the nuclear power plant server may determine whether the drone is located in the entry restricted area of the nuclear power plant. Thereafter, when the drone is located in the entry restricted area of the nuclear power plant as a result of determination, the nuclear power plant server may transmit the flight permission message to the flight permission approval server to permit the flight of the drone. In addition, the nuclear power plant server may permit the flight by transmitting the flight permission message to the drone through the nuclear power plant transceiver. In addition, the nuclear power plant server may acquire the position information of the drone and change the position of the drone on the 3D map. In this case, when the trustworthiness of the distributed packet is not confirmed, the nuclear power plant server may transmit a flight prohibition message to the flight permission approval server to disallow the flight of the drone. Also, the nuclear power plant server may disallow the flight by transmitting the flight prohibition message to the drone through the nuclear power plant transceiver.

Meanwhile, drones may be expected to operate autonomously in the future. For such the autonomous operations, the drones may need to avoid moving obstacles that are difficult to be included in a 3D map. In general, the drones can avoid topographic features by using a 3D map, but there may be moving obstacles that are difficult to be included in the 3D map.

An obstacle device installed on a moving obstacle may broadcast the position of the moving obstacle using wireless distributed communication. In this case, the obstacle device may use an open trust field. However, the drone cannot verify a trustworthiness of a distributed packet transmitted from the obstacle device using the open trust field. This is because only trusted authority can perform trustworthiness check on the open trust field. Thus, the obstacle device may use a group trust field.

On the other hand, there may be differences between the example of the nuclear power plant server and the example of the obstacle device. The nuclear power plant server may transmit the secret key it generated to the flight permission approval server. However, it may be difficult for the obstacle device to directly access the flight permission approval server.

If the obstacle device is to be directly connected to the flight permission approval server, a separate communication means for the connection may be required. For this purpose, the obstacle device may rely on mobile communications. As a result, costs may rise, larger hardware may be required, and more power may be required.

Therefore, the obstacle device may be more economical to rely on manual inputs of an administrator than to receive a group code and a secret key from the flight permission approval server through communications. However, a problem with such the manual inputs may be that it is difficult to update the secret key. It may be too cumbersome for the administrator to manually enter the periodically updated secret key into the obstacle device. Thus, multiple secret key structures may be required.

Figure 4:
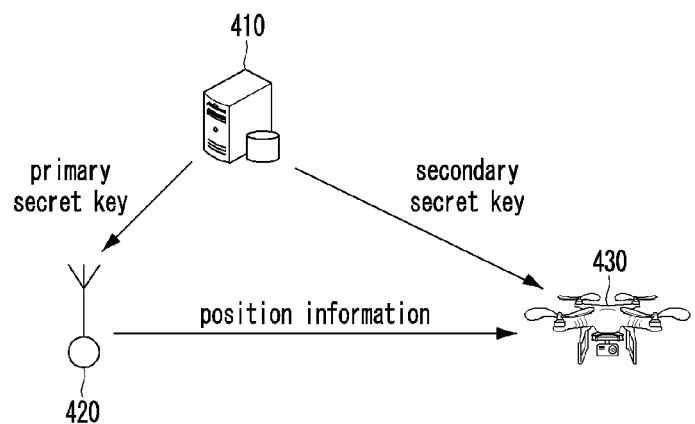
FIG. 4 is a conceptual diagram illustrating a second exemplary embodiment of an apparatus for guaranteeing trust of packets.

FIG. 4 is a conceptual diagram illustrating a second exemplary embodiment of an apparatus for guaranteeing trust of packets.

Referring to FIG. 4, an apparatus for guaranteeing trust of packets may include a flight permission approval server 410, an obstacle device 420, and a drone 430. In such the apparatus for guaranteeing trust of packets, the flight permission approval server 410 may manage a group code, a primary secret key, and a secondary secret key periodically updated from the primary secret key. The flight permission approval server 410 may provide the group code and the primary secret key to the obstacle device 420. In addition, the flight permission approval server 410 may provide information on a scheme of updating the primary secret key to the obstacle device 420.

In addition, the flight permission approval server 410 may inform the obstacle device 420 of the scheme of generating group trust bits using the group code and the secondary secret key updated from the primary secret key. In addition, the flight permission approval server 410 may provide the group code and the secondary secret key to the drone 430. In addition, the flight permission approval server 410 may inform the drone 430 of the scheme of generating group trust bits using the group code and the secondary secret key.

On the other hand, the obstacle device 420 may receive the group code and the primary secret key from the flight permission approval server (410). In addition, the obstacle device 420 may periodically update the primary secret key to generate the updated secondary secret key. Thereafter, the obstacle device 420 may generate group trust bits by using the received group code and secondary secret key. In this case, the obstacle device 420 may further use at least one of a transmission time and an identifier of the obstacle device when generating the group trust bits.

Thereafter, the obstacle device 420 may generate a distributed packet including at least one of a source address, position information, group code, group trust bits, transmission time, or a combination thereof. In addition, the obstacle device 420 may transmit the generated distributed packet to the drone 430. Accordingly, the drone 430 may receive the distributed packet from the obstacle device 420. In this case, the drone 430 may perform a trustworthiness check on the distributed packet received from the obstacle device 420. That is, the drone 430 may obtain the group code from the received distributed packet.

In addition, the drone 430 may determine whether the obtained group code is the same as the group code received from the flight permission approval server 410. As a result of the determination, if the group codes are the same, the drone 430 may generate the group trust bits based on the group code and the secondary secret key by using the scheme of generating group trust bits informed by the flight permission approval server 410. In this case, the drone 430 may generate the group trust bits by additionally using at least one of the transmission time and the identifier of the obstacle device. In addition, the drone 430 may determine whether the generated group trust bits are the same as the group trust bits in the distributed packet received from the obstacle device 420. The drone 430 may confirm that the distributed packet is trusted if the generated group trust bits are the same as the group trust bits received from the obstacle device 420.

The drone 430 may obtain position information of the obstacle device 420 and display the obstacle device 420 on a provided 3D map when the trustworthiness is confirmed as a result of the trustworthiness check. Alternatively, the drone 430 may ignore the position information of the obstacle device 420 when the trustworthiness is not confirmed as a result of the trustworthiness check. An operation of the apparatus for guaranteeing trust of packets will be described with reference to FIG. 5 as follows.

Figure 5:
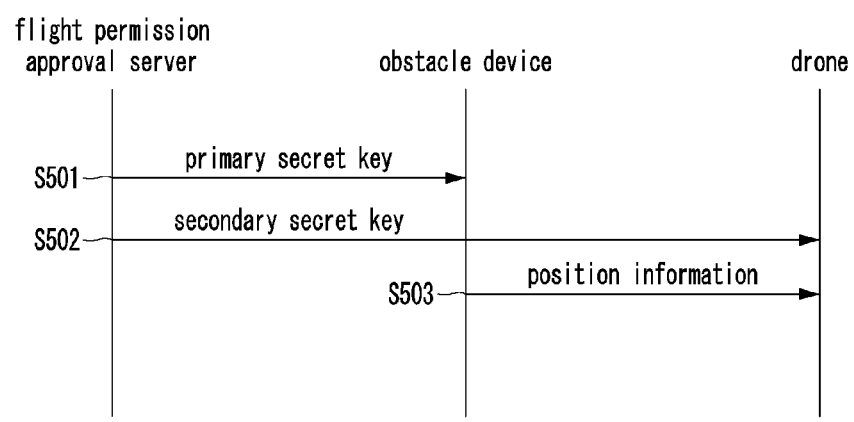
FIG. 5 is a sequence chart illustrating a second exemplary embodiment of a method for guaranteeing trust of packets.

FIG. 5 is a sequence chart illustrating a second exemplary embodiment of a method for guaranteeing trust of packets.

Referring to FIG. 5, in a method for guaranteeing trust of packets, the flight permission approval server may provide the group code and the primary secret key to the obstacle device (S501). Then, the flight permission approval server may provide the group code and the secondary secret key to the drone (S502).

On the other hand, the obstacle device may receive the group code and the primary secret key from the flight permission approval server. In addition, the obstacle device may generate an updated secondary secret key by periodically updating the primary secret key. Thereafter, the obstacle device may generate group trust bits by using the received group code and the secondary secret key. In this case, the obstacle device may use at least one of a transmission time and an identifier of the obstacle device when generating the group trust bits.

Thereafter, the obstacle device may generate a distributed packet including at least one or more of source address, position information, group code, group trust bits, transmission time, or a combination thereof. Then, the obstacle device may transmit the generated distributed packet including the position information to the drone (S503). Accordingly, the drone may receive the distributed packet from the obstacle device. In this case, the drone may perform a trustworthiness check on the distributed packet received from the obstacle device. When the trustworthiness is confirmed as a result of the trustworthiness check, the drone may obtain the position information of the obstacle device and may display the obstacle device on a 3D map it has. In contrast, the drone may ignore the position information of the obstacle device when the trustworthiness is not confirmed as a result of the trustworthiness check.

Figure 6:
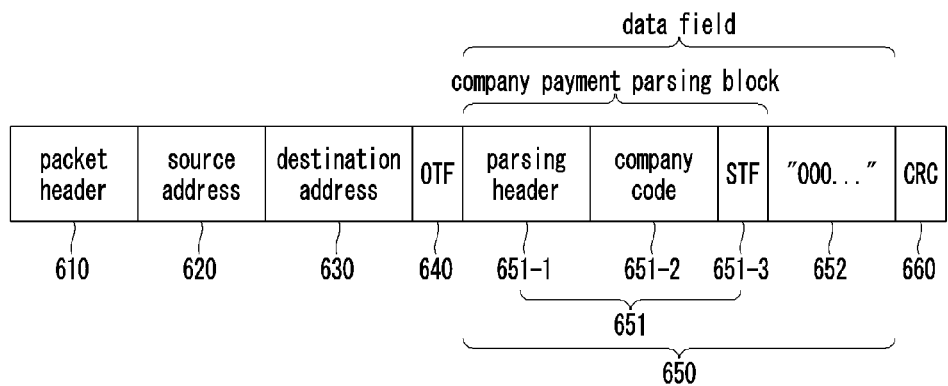
FIG. 6 is a block diagram illustrating a first exemplary embodiment of a distributed packet including a special trust field (STF).

FIG. 6 is a block diagram illustrating a first exemplary embodiment of a distributed packet including a special trust field (STF).

Referring to FIG. 6, a distributed packet may include a packet header field 610, a source address field 620, a destination address field 630, an open trust field 640, a data field 650, and a CRC field 660. Here, the packet header field 610 may be a field for indicating a packet type. In this case, the packet type may be, for example, a payment request packet. A drone may indicate the payment request packet by using, for example, a hexadecimal value 0x0B in the packet header field 610. Then, the source address field 620 may be a field for indicating a source address of the distributed packet.

The drone may perform transmission by designating its identifier (ID) in the source address field 620. The destination address field 630 may be a field for indicating a destination address of the distributed packet. The drone may designate the destination address in the destination address field 630. In addition, the open trust field 640 may be a field that allows trustworthiness of the distributed packet to be confirmed through a trusted authority designated by the wireless distributed communication system.

Meanwhile, the data field 650 may include a company payment parsing block 651 and a general data field 652. Here, the company payment parsing block 651 may be a parsing block related to company payment. The company payment parsing block 651 may include a parsing header field 651-1, a company code field 651-2, and a specific trust field 651-3. Here, the parsing header field 651-1 may be a field for indicating a property of information included in the company payment parsing block 651.

For example, the drone may provide a company code through the continued company code field 651-2 by using a hexadecimal value 0x06, and may indicate that specific trust bits are provided through the specific trust field 651-3. Also, the company code field 651-2 may be a field for indicating the company code. The terminal may perform transmission by designating the company code in the company code field 651-2.

The specific trust field 651-3 may refer to a field inserted into the packet so that a trustworthiness check can be performed between any two specific terminals in wireless distributed communication. The specific trust field 651-3 may include specific trust bits generated using the company code and the secret key. Here, the drone may generate the specific trust bits using the company code and the secret key. A scheme of generating the specific trust bits using the group code and the secret key may include a scheme of using a linear feedback shift register. In this case, the drone may generate the specific trust bits by using the company code, the identifier of the drone, and the secret key.

Alternatively, the drone may generate the specific trust bits by using the company code, terminal identifier, transmission time, and secret key. The drone may transmit the packet by designating the specific trust bits in the specific trust field 651-3. In addition, the general data field 652 may include data that the drone needs to transmit, and may include, for example, the transmission time of the distributed packet. However, in the synchronous wireless distributed communication, the drone may not transmit the transmission time through the general data field 652. This may be because, in the synchronous wireless distributed communication, a slot time of a slot in which the corresponding distributed packet is transmitted may be set to a time at which the specific trust bits are generated. The CRC field 660 may indicate a CRC to determine whether a received packet has an error.

In such the distributed packet, the specific trust field may be used for multiple purposes. After two terminals simply share each other's identifier and the secret key for generating the specific trust field, the two terminals may authenticate each other through them. However, such the method may correspond to simple one-to-one communication. Therefore, there may be no reason for the terminals to use the specific trust field. That is, the two terminals may use a general one-to-one security technique.

Accordingly, in exemplary embodiments of the present disclosure, the wireless distributed communication system may use the specific trust field in a many-to-many communication structure. To this end, in the present disclosure, it may be specifically assumed that the first terminal and a third terminal may use distributed communication. In addition, it may be assumed that the second terminal and the third terminal are connected by different communication means. In addition, it may be assumed that the first terminal may be connected to the second terminal through the third terminal.

First, the first terminal and the second terminal may generate the specific trust fields. The first terminal and the second terminal may share each other's identifier and the secret key for generating the specific trust field in order to perform trustworthiness checks. Accordingly, the first terminal may transmit the identifier and the secret key to the second terminal. In this case, the second terminal may store the identifier and the secret key of the first terminal. Similarly, the second terminal may transmit the identifier and the secret key to the first terminal. The first terminal may store the identifier and the secret key of the second terminal.

Here, the first terminal may use a specific code designating itself instead of the identifier. The first terminal may transmit the specific code designating itself instead of the identifier to the second terminal. The second terminal may store the specific code and the secret key of the first terminal.

In addition, the second terminal may use the specific code designating itself instead of the identifier. Accordingly, the second terminal may transmit the specific code designating itself instead of the identifier to the first terminal. In this case, the first terminal may store the specific code and the secret key of the second terminal. In this case, the first terminal and the second terminal may each have received the specific code to be shared in advance from a management entity of the wireless distributed communication system.

The first terminal may generate a specific trust field using the secret key shared with the second terminal. In addition, the first terminal may transmit a distributed packet including the generated specific trust field, the code, and information on a requested operation to the third terminal that does not share the secret key. Here, there may be two schemes for the first terminal to include the information on the requested operation in the packet. One scheme may be to construct the packet using a packet header indicating the requested operation. Another scheme may be to include the information on the requested operation in the data field of the packet.

The third terminal may receive the distributed packet from the first terminal. In this case, since the third terminal does not have a related secret key, it cannot perform a trustworthiness check on it. Accordingly, the third terminal may transmit the received distributed packet to the second terminal matching the specific code. The second terminal may perform a trustworthiness check on the distributed packet received from the third terminal by using the secret key shared with the first terminal. In this case, when the trustworthiness is secured as a result of the trustworthiness check, the second terminal may perform the requested operation indicated by the distributed packet. when the trustworthiness is not secured as a result of the trustworthiness check, the second terminal may not perform the requested operation indicated by the distributed packet.

Figure 7:
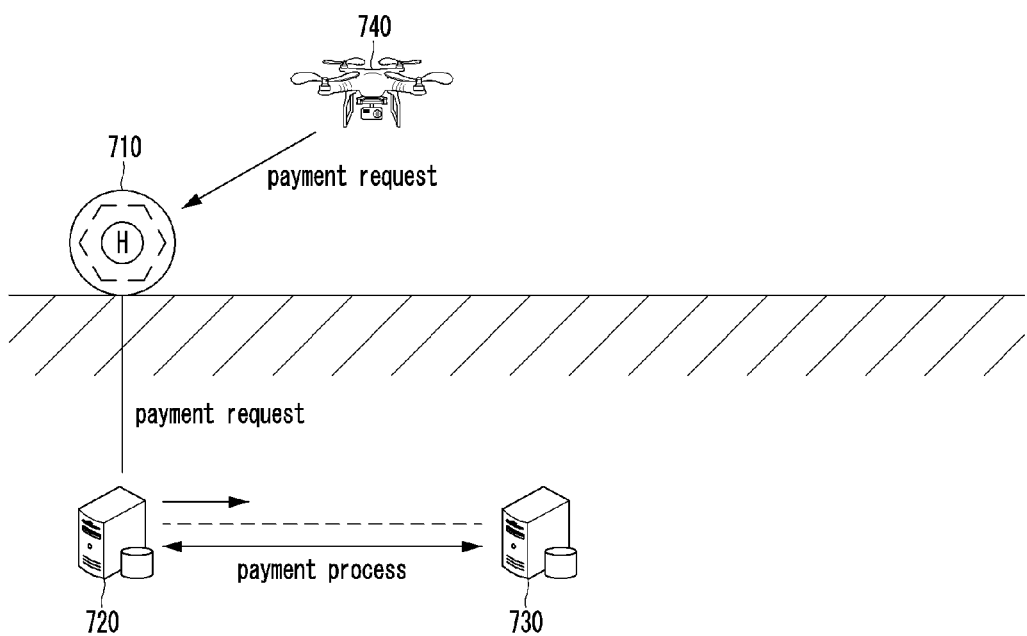
FIG. 7 is a conceptual diagram illustrating a third exemplary embodiment of an apparatus for guaranteeing trust of packets.

An example in which such the wireless distributed communication system uses the specific trust field may be shown in FIG. 7. If a drone taxi is commercialized in the future, the drone taxi may use a landing site for drone taxis. The drone taxi may obtain a landing permission prior to landing on the landing site. In this case, a drone taxi company may pay a drone usage fee to a landing site server. Here, the landing site may be regarded as an entry restricted area.

FIG. 7 is a conceptual diagram illustrating a third exemplary embodiment of an apparatus for guaranteeing trust of packets.

Referring to FIG. 7, an apparatus for guaranteeing trust of packets may include a landing site transceiver 710, a landing site server 720, a drone company server 730, and a drone taxi 740. Here, the landing site server 720 and the drone company server 730 may be connected through reliable communication.

In such the apparatus for guaranteeing trust of packets, the landing site transceiver 710 may receive a distributed packet including a payment request of requesting payment through a company and requesting a landing permission according to payment processing from the drone taxi 730. Here, the payment request through the company and the landing permission according to the payment processing may be an operation to be processed by the landing site server 720. In addition, the payment request through the company may be an operation to be processed by the drone company server 730. In addition, the landing site transceiver 710 may transmit, to the landing site server 720, the distributed packet including the payment request and requesting landing permission according to the payment processing received from the drone taxi 730. On the other hand, the landing site transceiver 710 may receive a landing permission signal transmitted from the landing site server 720 according to completion of the payment processing. In addition, the landing site transceiver 710 may transmit the received landing permission signal to the drone taxi 730.

The landing site server 720 may have a list of company codes of drone companies using the landing site. The landing site server 720 may receive the distributed packet including the payment request for landing of the drone taxi 730 and requesting the landing permission according to the payment processing from the landing site receiver 710. In addition, the landing site server 720 may obtain the company code of the distributed packet received from the drone taxi 730 through the landing site transceiver 710. In addition, the landing server 720 may request payment by transmitting the distributed packet to the drone company server 730 corresponding to the company code obtained from the distributed packet with reference to the list of company codes of drone companies it has. In this case, the landing site server 720 may further transmit additional information (e.g., account number, payment amount) required for payment to the drone company server 730. In this case, the landing site server 720 may provide information on a reception time of the distributed packet to the drone company server 730.

Of course, the landing site server 720 may request payment by transmitting a part of the distributed packet received from the drone taxi 730 through the landing site transceiver 710 to the drone company server 730. Here, a part of the distributed packet transmitted by the landing site server 720 to the drone company server 730 may include an identifier (i.e., source address) of the drone taxi 740, payment request information, and specific trust bits (i.e., specific trust field). In this case, the landing site server 720 may additionally transmit additional information (e.g., account number, payment amount) necessary for the payment to the drone company server 730. In this case, the landing site server 720 may provide information on a reception time of the distributed packet to the drone company server 730.

Meanwhile, the landing site server 720 may receive an operation request according to an operation content (i.e., payment processing request) from the drone company server 730. In addition, the landing site server 720 may receive a landing site usage fee from the drone company server 730 by performing a payment operation with the drone company server 730 according to such the operation request. Then, the landing site server 720 may transmit a landing permission signal to the drone taxi 740 through the landing site transceiver 710. Of course, the landing site server 720 may not be able to proceed with the payment with the drone company server 730 through this process. In this case, the landing site server 720 may not receive a landing site usage fee from the drone company server 730. Accordingly, the landing site server 720 may transmit a landing prohibition signal to the drone taxi 740 through the landing site transceiver 710.

The drone company server 730 may manage the drone taxi identifier, company code, and secret key. In addition, the drone company server 730 may transmit the company code and the secret key for generating the specific trust field to the drone taxi 740 and share it with the drone taxi 740. In addition, the drone company server 730 may inform a scheme of generating specific trust bits using the company code and the secret key to the drone taxi 740.

Thereafter, the drone company server 730 may receive a distributed packet including a payment request related to the landing of the drone taxi 740 from the landing site server 720. In addition, the drone company server 730 may receive additional payment information (e.g., account number of the landing site server, payment amount) required for processing the payment related to the landing of the drone taxi 740 from the landing site server 720. Also, the drone company server 730 may receive information on a reception time of the distributed packet from the landing site server 720. As described above, the drone company server 730 may receive the distributed packet, payment additional information, and reception time information generated by the drone taxi 740 from the landing site server 720. Alternatively, the drone company server 730 may receive a part of the distributed packet generated by the drone taxi 740, payment additional information, and reception time information from the landing site server 720. Here, a part of the distribution packet may include an identifier (i.e., a source address) of the drone taxi 740, payment request information, and specific trust bits (i.e., specific trust field).

Accordingly, the drone company server 730 may perform a trustworthiness check by using the received company code and specific trust field. The drone company server 730 may determine whether the obtained company code is the same as the company code transmitted to the drone taxi 740. As a result of the determination, if the company codes are the same, the drone company server 730 may generate specific trust bits based on the company code and the secret key by using the scheme of generating specific trust bits notified to the drone taxi 740. In this case, the drone company server 730 may additionally use at least one of the transmission time and the drone taxi identifier to generate the specific trust bits. In addition, the drone company server 730 may determine whether the generated specific trust bits are the same as the specific trust bits in the distributed packet received from the drone taxi 740. The drone company server 730 may confirm that the distributed packet is trusted if the generated specific trust bits are the same as the specific trust bits received from the drone taxi 740.

In this case, the drone company server 730 may perform a trustworthiness check by using the transmission time or reception time information in addition to the received company code, specific trust field, and drone taxi identifier. As a result of the trustworthiness check, if the trustworthiness is secured, the drone company server 730 may perform a payment operation with the landing site server 720 to pay a landing site usage fee to the payment server 720. As a result of the trustworthiness check, the trustworthiness is not secured, the drone company server 730 may not perform a payment operation with the landing site server 720.

On the other hand, the drone taxi 740 may receive the company code and the secret key from the drone company server 740. In addition, the drone taxi 740 may receive information on the scheme of generating specific trust bits using the company code and the secret key from the drone company server 740.

In addition, the drone taxi 740 arriving near the landing site may transmit a distributed packet to the landing site transceiver 710. In this case, the distributed packet transmitted by the drone taxi 740 may include a packet header field, a source address field, a destination address field, an open trust field, a data field, and a CRC field. Here, the packet header field may include a packet header indicating that it is a payment request packet.

In addition, the source address field may include the identifier of the drone 740. In addition, the destination address field may include an identifier of the landing site server 720. The data field may include the drone company's company code, specific trust field, and related data. Thereafter, the drone taxi 740 may receive a landing permission signal from the landing transceiver 710. Accordingly, the drone taxi 740 may land on the landing site. The operation of the apparatus for guaranteeing trust of packets may be as follows with reference to FIG. 8.

Figure 8:
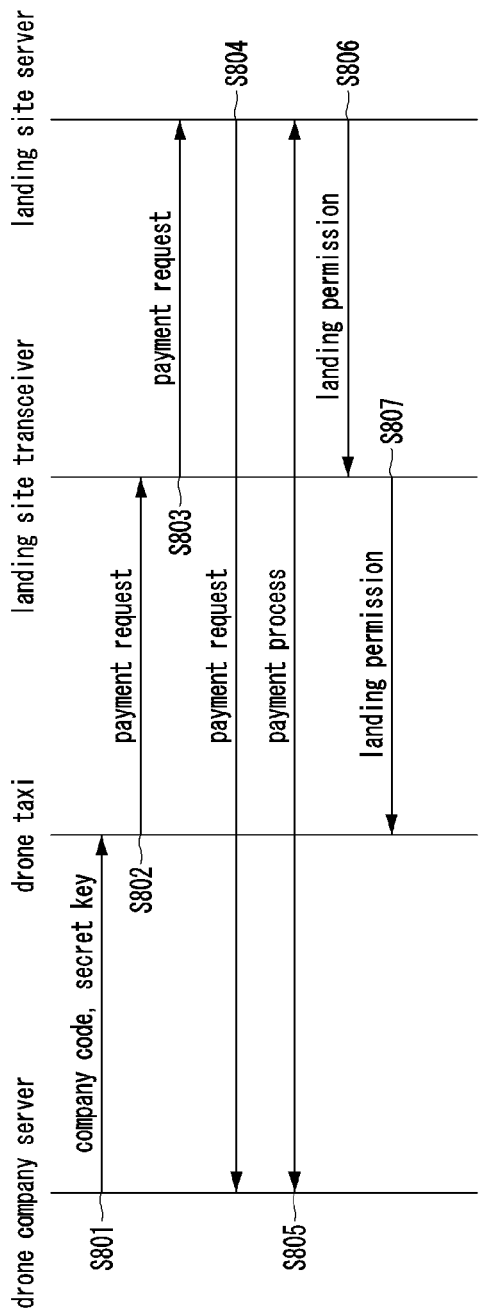
FIG. 8 is a sequence chart illustrating a third exemplary embodiment of a method for guaranteeing trust of packets.

FIG. 8 is a sequence chart illustrating a third exemplary embodiment of a method for guaranteeing trust of packets.

Referring to FIG. 8, in a method for guaranteeing trust of packets, the drone company server may manage the drone taxi identifier, the company code, and the secret key. Then, the drone company server may transmit the company code and the secret key for generating a specific trust field to the drone taxi and share it with the drone taxi (S801). In addition, the drone company server may transmit information on a scheme of generating specific trust bits using the company code and the secret key to the drone taxi. On the other hand, the drone taxi may receive the company code and the secret key from the drone company server. In addition, the drone taxi may receive the information on the scheme of generating specific trust bits using the company code and the secret key from the drone company server.

Then, the drone taxi arriving near the landing site may transmit a distributed packet for requesting a payment request and a landing permission to the landing site transceiver (S802). In this case, the distributed packet transmitted by the drone taxi may include a packet header field, a source address field, a destination address field, an open trust field, a data field, and a CRC field. Here, the packet header field may include a packet header indicating that it is a payment request packet. The source address field may include the identifier of the drone taxi. The destination address field may include the identifier of the landing site server. The data field may include the drone company's company code, specific trust field, and related data.

Accordingly, the landing site transceiver may receive the distributed packet requesting payment through the company for landing from the drone taxi. In addition, the landing site transceiver may transmit the distributed packet including the payment request and requesting a landing permission received from the drone taxi to the landing site server (S803). Then, the landing site server may receive the distributed packet including the payment request for the landing of the drone taxi and the landing request from the landing site receiver. In addition, the landing site server may request payment by transmitting the distributed packet requesting payment received from the drone taxi through the landing site transceiver to the drone company server (S804). In this case, the landing site server may transmit information on a reception time of the distributed packet to the drone company server.

In this case, the landing site server may additionally transmit additional information (e.g., account number, payment amount) required for the payment to the drone company server. Of course, the landing site server may request the payment by transmitting a part of the distributed packet requesting the payment received from the drone taxi through the landing site transceiver to the drone company server. Here, a part of the distributed packet transmitted by the landing site server to the drone company server may include the identifier (i.e., source address) of the drone taxi, information on a requested operation (i.e., payment request), and the specific trust field. In this case, the landing site server may transmit information on the reception time of the distributed packet to the drone company server.

In this case, the landing site server may additionally transmit additional information (e.g., account number, payment amount) required for the payment to the drone company server. The drone company server may receive the payment request related to the landing of the drone taxi from the landing site server. In this manner, the drone company server may receive the distributed packet and the payment related information generated by the drone taxi from the landing site server. Alternatively, the drone company server may receive a part of the distributed packet and the payment related information generated by the drone taxi from the landing site server.

Accordingly, the drone company server may perform a trustworthiness check by using the received company code and specific trust field. In this case, the drone company server may perform the trustworthiness check by using the received company code and secret key. In addition, the drone company server may perform the trustworthiness check by using the received company code, secret key, and transmission time. In addition, the drone company server may perform the trustworthiness check by using the received company code, secret key, transmission time, and drone taxi identifier. In addition, the drone company server may perform the trustworthiness check by using the received company code, secret key, and information on the reception time. In addition, the drone company server may perform the trustworthiness check by using the received company code, secret key, reception time information, and drone taxi identifier. As a result of such the trustworthiness check, when the trustworthiness is secured, the drone company server may perform a payment operation with the landing site server (S805) to pay a landing site usage fee to the landing site server. When trustworthiness is not secured as a result of the trustworthiness check, the drone company server may not perform the payment with the landing site server.

On the other hand, the landing site server may receive a landing site usage fee from the drone company server by performing a payment process with the drone company server through the above-described process. Then, the landing site server may transmit a landing permission signal to the drone taxi through the landing site transceiver (S806, S807). Of course, the landing site server may not be able to perform the payment process with the drone company server through the above-described process. Then, the landing site server may not receive the landing fee from the drone company server. Accordingly, the landing site server may transmit a landing prohibition signal to the drone taxi through the landing site transceiver. Accordingly, the drone taxi may receive the landing prohibition signal from the landing site transceiver. Accordingly, the drone taxi may not land on the landing site.

Figure 9:
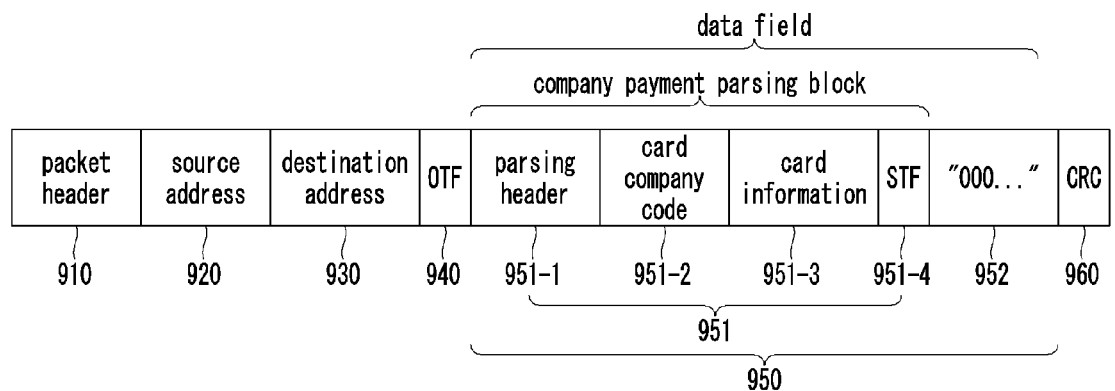
FIG. 9 is a block diagram illustrating a second exemplary embodiment of a distributed packet including a specific trust field.

FIG. 9 is a block diagram illustrating a second exemplary embodiment of a distributed packet including a specific trust field.

Referring to FIG. 9, a distributed packet may include a packet header field 910, a source address field 920, a destination address field 930, an open trust field 940, a data field 950, and a CRC field 960. Here, the packet header field 910 may be a field for indicating a packet type. In this case, the packet type may be, for example, a card payment request packet. The terminal may indicate the card payment request packet by using, for example, a hexadecimal value 0x0C in the packet header field 910. The source address field 920 may be a field for indicating a source address of the distributed packet.

The terminal may transmit the distributed packet by designating its identifier (ID) in the source address field 920. The destination address field 930 may be a field for indicating a destination address of the distributed packet. The terminal may transmit the distributed packet by designating the destination address in the destination address field 930. In addition, the open trust field 940 may be a field that allows trustworthiness of the distributed packet to be confirmed through a trusted authority designated by the wireless distributed communication system.

Meanwhile, the data field 950 may include a card company payment parsing block 951 and a general data field 952. Here, the card company payment parsing block 951 may be a parsing block related to card payment. The card company payment parsing block 951 may include a parsing header field 951-1, a card company code field 951-2, a card information field 951-3, and a specific trust field 951-4. Here, the parsing header field 951-1 may be a field for indicating a property of information included in the card company payment parsing block 951.

The parsing header field 951-1 may provide a card company code through the continued card company code field 951-2 by using a hexadecimal value 0x07, may provide card information through the card information field 951-2, and may indicate that specific trust bits can be provided through the specific trust field 951-4. In addition, the card company code field 951-2 may be a field for indicating the card company code. The terminal may transmit the distributed packet by designating the card company code in the card company code field 951-2.

The card information field 951-3 is for providing the card information and may include the card number. In addition, the specific trust field 951-4 may refer to a field inserted into the packet so that a mutual trustworthiness check can be performed between any two specific terminals in wireless distributed communication. The specific trust field 951-4 may include specific trust bits generated using the card company code and the secret key.

Here, the terminal may generate the specific trust bits by using the card company code and secret key. Alternatively, the terminal may generate the specific trust bits using the card company code, terminal identifier, and secret key. Alternatively, the terminal may generate the specific trust bits by using the card company code, terminal identifier, transmission time, and secret key. The terminal may transmit the distributed packet by designating the specific trust bits in the specific trust field 951-4. In addition, the general data field 952 may include data that the terminal needs to transmit. As an example, the general data field 952 may include a transmission time of the distributed packet. The CRC field 960 may designate a CRC to determine whether the distributed packet has an error.

Figure 10:
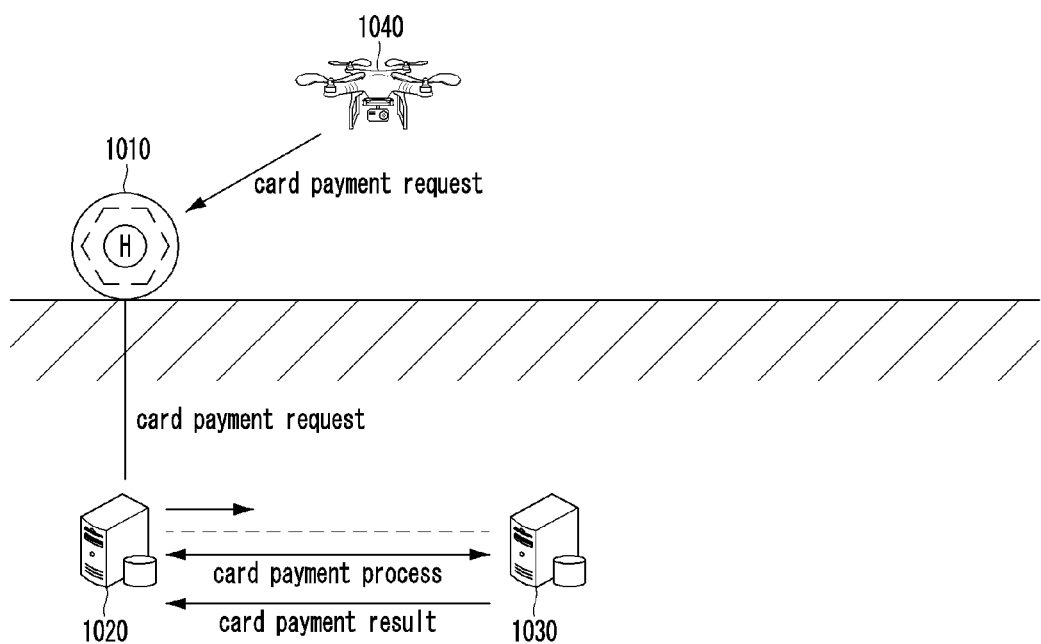
FIG. 10 is a conceptual diagram illustrating a fourth exemplary embodiment of an apparatus for guaranteeing trust of packets.

FIG. 10 is a conceptual diagram illustrating a fourth exemplary embodiment of an apparatus for guaranteeing trust of packets.

Referring to FIG. 10, an apparatus for guaranteeing trust of packets may include a landing site transceiver 1010, a landing site server 1020, a card company server 1030, and a drone taxi 1040. Here, the landing site server 1020 and the card company server 1030 may be connected through reliable communication.

In such the apparatus for guaranteeing trust of packets, the landing site transceiver 1010 may receive a distributed packet requesting a payment through a card company and a landing permission for landing from the drone taxi 1030. In addition, the landing site transceiver 1010 may transmit the distributed packet including the card payment request and the landing permission received from the drone taxi 1030 to the landing site server 1020.

On the other hand, the landing site transceiver 1010 may receive a card payment result signal transmitted from the landing site server 1020 upon completion of the card payment processing. In addition, the landing transceiver 1010 may transmit the received card payment result signal to the drone taxi 1030. In addition, the landing site transceiver 1010 may receive a landing permission signal transmitted from the landing site server 1020 upon completion of the card payment processing. In addition, the landing site transceiver 1010 may transmit the received landing permission signal to the drone taxi 1030.

The landing site server 1020 may receive the distributed packet including the card payment request and the landing permission the for landing of the drone taxi 1030 from the landing site receiving device 1010. In addition, the landing site server 1020 may request card payment by transmitting the distributed packet received from the drone taxi 1030 through the landing site transceiver 1010 to the card company server 1030. In this case, the landing site server 1020 may additionally transmit additional information (e.g., account number, payment amount) required for the payment to the card company server 1030. In this case, the landing site server 1020 may additionally transmit information on a reception time of the distributed packet and information on a propagation delay time from the drone taxi 1040 to the payment server 1020 to the card company server 1030.

Alternatively, the landing site server 1020 may request the payment by transmitting a part of the distributed packet requesting the card payment received from the drone taxi 1030 through the landing site transceiver 1010 to the card company server 1030. Here, a part of the distributed packet transmitted by the landing server 1020 to the card company server 1030 may include an identifier (i.e., source address) of the drone taxi 1040, information on an requested operation, card information, and the specific trust field. In this case, the landing site server 1020 may additionally transmit additional information (e.g., account number, payment amount) required for the payment to the card company server 1030. In addition, the landing site server 1020 may additionally transmit information on the reception time of the distributed packet and information on a propagation delay time of the distributed packet from the drone taxi 1040 to the payment server 1020 to the card company server 1030.

On the other hand, the landing site server 1020 may receive an operation request according to an operation content (i.e., payment processing request) from the card company server 1030. In addition, the landing site server 1020 may receive a card payment result signal from the card company server 1030 by performing a payment process with the card company server 1030 according to such the operation request. Then, the landing site server 1020 may transmit the card payment result signal to the drone taxi 1040 through the landing site transceiver 1010. In addition, the landing site server 1020 may transmit a landing permission signal to the drone taxi 1040 through the landing site transceiver 1010. Of course, the landing server 1020 may not be able to proceed with the payment with the card company server 1030 through the above-described process. Then, the landing site server 1020 may not receive a landing site usage fee from the card company server 1030. Accordingly, the landing site server 1020 may transmit a landing prohibition signal to the drone taxi 1040 through the landing site transceiver 1010.

The card company server 1030 may manage the drone taxi identifier, the card company code, and the secret key. In addition, the card company server 1030 may transmit the card company code and the secret key for generating the specific trust field to the drone taxi 1040 and share it with the drone taxi 1040. In addition, the card company server 1030 may transmit and share information on a scheme of generating specific trust bits using the card company code and the secret key to the drone taxi 1040.

Thereafter, the card company server 1030 may receive the card payment request related to the landing of the drone taxi 1040 from the landing site server 1020. In this case, the card company server 1030 may receive the distributed packet and card payment related information generated by the drone taxi 1040 from the landing site server 1020. In addition thereto, the card company server 1030 additionally receives information on the reception time of the distributed packet and the propagation delay time of the distributed packet from the drone taxi 1040 to the payment server 1020 from the landing site server 1020. Alternatively, the card company server 1030 may receive a part of the distributed packet and payment related information generated by the drone taxi 1040 from the landing server 1020. In addition thereto, the card company server 1030 may additionally receive information on the reception time of the distributed packet from the drone taxi 1040 and information on the propagation delay time from the drone taxi 1040 to the payment server 1020 from the landing site server 1020.

Accordingly, the card company server 1030 may perform a trustworthiness check by using the secret key shared with the drone taxi 1040 and the card company code and specific trust bits included in the distributed packet.

Accordingly, the card company server 1030 may perform a trustworthiness check by using the received card company code and specific trust field. The card company server 1030 may determine whether the obtained card company code is the same as the card company code transmitted to the drone taxi 1040. As a result of the determination, if the card company codes are the same, the card company server 1030 may generate specific trust bits based on the card company code and secret key by using the scheme of generating specific trust bits informed to the drone taxi 1040. In this case, the card company server 1030 may additionally use at least one of the transmission time and the drone taxi identifier to generate the specific trust bits.

In addition, the card company server 1030 may determine whether the generated specific trust bits are the same as the specific trust bits in the distributed packet received from the drone taxi 1040. The card company server 1030 may confirm that the distributed packet is trusted if the generated specific trust bits are the same as the specific trust bits received from the drone taxi 1040. In this case, the drone company server 1030 may perform the trustworthiness check by using a transmission time in addition to the received card company code, specific trust field, and drone taxi identifier.

In this case, when the transmission time cannot be identified in the distributed packet, the card company server 1030 may use the reception time and propagation delay time received from the landing site server 1020 to calculate the transmission time and use it. Looking at this in more detail, the card company server 1030 may calculate the transmission time by subtracting the propagation delay time from the reception time, and use the calculated transmission time. Meanwhile, the card company server 1030 may perform a trustworthiness check by using the shared secret key, the card company code included in the distributed packet, the specific trust bits, the transmission time, and the drone taxi identifier.

As a result of the trustworthiness check, when the trustworthiness is confirmed, the card company server 1030 may perform a payment operation with the landing site server 1020, and transmit a card payment result signal to the landing site server 1020 when the payment is completed. When the trustworthiness is not confirmed as a result of the trustworthiness check, the card company server 1030 may not perform a payment operation with the landing site server 1020.

On the other hand, the drone taxi 1040 may receive the card company code and the secret key from the card company server 1040. In addition, the drone taxi 1040 may receive and share information on the scheme of generating specific trust bits using the card company code and the secret key from the card company server 1040.

In addition, the drone taxi 1040 arriving near the landing site may transmit a distributed packet requesting payment through the card company to the landing site transceiver 1010. In this case, the distributed packet transmitted by the drone taxi 1040 may include a packet header field, a source address field, a destination address field, an open trust field, a data field, and a CRC field. Here, the packet header field may include a packet header indicating that the distributed packet is a card payment request packet. In addition, the source address field may include an identifier of the drone taxi 1040.

In addition, the destination address field may include an identifier of the landing site server 1020. The data field may include the card company code of the card company, the card information, the specific trust field, and related data. Thereafter, the drone taxi 1040 may receive a card payment result signal from the landing site transceiver 1010. Accordingly, the drone taxi 1040 may land on the landing site. In addition, the drone taxi 1040 may receive a landing permission signal from the landing site transceiver 1010. Accordingly, the drone taxi 1040 may land on the landing site. The operation of the apparatus for guaranteeing trust of packets may be as shown in FIG. 11.

Figure 11:
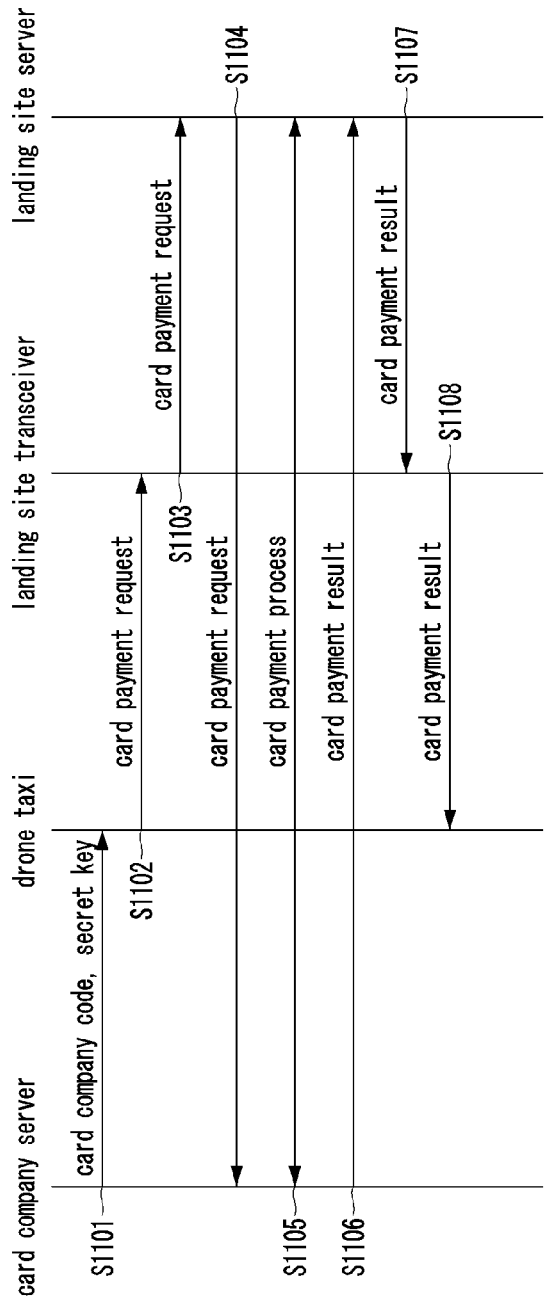
FIG. 11 is a sequence chart illustrating a fourth exemplary embodiment of a method for guaranteeing trust of packets.

FIG. 11 is a sequence chart illustrating a fourth exemplary embodiment of a method for guaranteeing trust of packets.

Referring to FIG. 11, in a method for guaranteeing trust of packets, the card company server may manage a drone taxi identifier, a card company code, and a secret key. Then, the card company server may transmit the card company code and the secret key for generating a specific trust field to the drone taxi, and share them with the drone taxi (S1101). On the other hand, the drone taxi may receive the card company code and secret key from the card company server.

Then, the drone taxi arriving near a landing site may transmit a distributed packet to the landing site transceiver (S1102). In this case, the distributed packet transmitted by the drone taxi may include a packet header field, a source address field, a destination address field, an open trust field, a data field, and a CRC field. Here, the packet header field may include a packet header indicating that the distributed packet is a card payment request packet. The source address field may include an identifier of the drone taxi. The destination address field may include an identifier of a landing site server. The data field may include the card company code of the card company, card information, a specific trust field, and related data. Here, the related data may be information on a transmission time of the distributed packet.

Accordingly, the landing site transceiver may receive a distributed packet requesting card payment through the card company for landing from the drone taxi. Then, the landing site transceiver may transmit the distributed packet requesting card payment received from the drone taxi to the landing site server (S1103). Then, the landing site server may receive the distributed packet requesting card payment for the landing of the drone taxi from the landing site receiver. In addition, the landing site server may request the payment by transmitting the distributed packet requesting card payment received from the drone taxi through the landing site transceiver to the card company server (S1104).

In this case, the landing site server may additionally transmit information required for the payment (e.g., account number, payment amount) to a card company server. In addition, the landing site server may additionally transmit information on a reception time of the distributed packet and information on a propagation delay time from the drone taxi to the payment server to the card company server.

Alternatively, the landing site server may request the payment by transmitting a part of the distributed packet requesting card payment received from the drone taxi through the landing site transceiver to the card company server. Here, a part of the distributed packet transmitted by the landing site server to the card company server may include the identifier (i.e., source address) of the drone taxi, information on a requested operation, encrypted card information, and the specific trust field.

In this case, the landing site server may additionally transmit information required for the payment (e.g., account number, payment amount) to the card company server. In addition, the landing site server may additionally transmit information on the reception time of the distributed packet and information on the propagation delay time from the drone taxi to the payment server to the card company server.

The card company server may receive a payment request related to the landing of the drone taxi from the landing site server. In this case, the card company server may receive the distributed packet generated by the drone taxi and card payment related information from the landing site server. Alternatively, the card company server may receive a part of the distributed packet generated by the drone taxi and card payment related information from the landing site server.

Accordingly, the card company server may perform a trustworthiness check by using the secret key shared with the drone taxi, and the card company code and the specific trust bits included in the distributed packet. Alternatively, the card company server may perform the trustworthiness check using by the shared secret key, and the card company code specific trust bits, and transmission time included in the distributed packet. In this case, when the transmission time is identified in the distributed packet, the card company server may calculate the transmission time by using the reception time and propagation delay time received from the landing site server, and use the calculated transmission time.

Looking at this in more detail, the card company server may calculate the transmission time by subtracting the propagation delay time from the reception time, and use the calculated transmission time. Meanwhile, the card company server may perform the trustworthiness check by using the shared secret key, and the card company code, specific trust bits, transmission time, and drone taxi identifier included in the distributed packet.

As a result of such the trustworthiness check, when trustworthiness is confirmed, the card company server may perform a payment operation with the landing site server and, when the payment is completed, transmit a card payment result signal to the landing site server (S1106). In this case, the card payment result signal transmitted from the card company server to the landing site server may include a card payment result, a generation time of trust bits, and the trust bits. If the trustworthiness is not confirmed as a result of the trustworthiness check, the card company server may not perform the payment with the landing site server.

Figure 12:
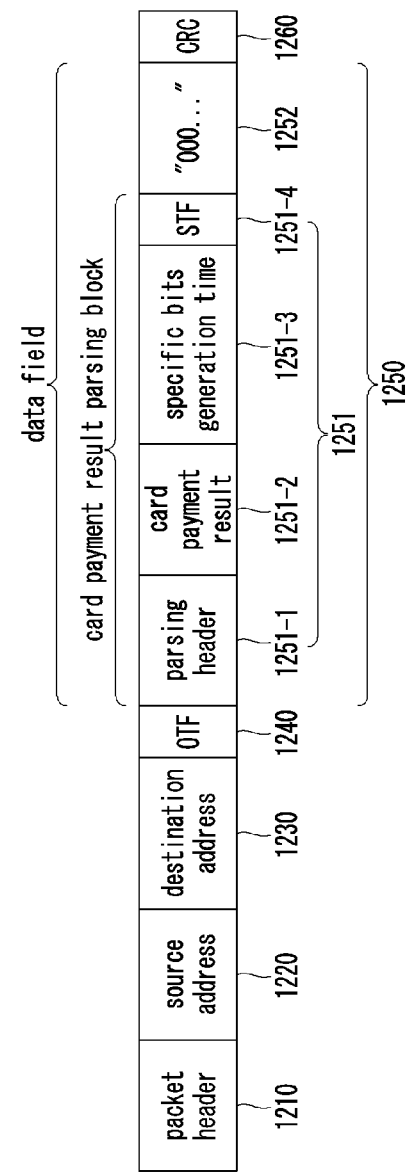
FIG. 12 is a block diagram illustrating a fourth exemplary embodiment of a distributed packet including a specific trust field.

On the other hand, the landing site server may receive the card payment result signal from the card company server. Then, the landing site server may transmit the card payment result signal having a configuration as shown in FIG. 12 to the landing site transceiver (S1107). Then, the landing site transceiver may receive the card payment result signal from the landing site server, and may transmit the card payment result signal to the drone taxi (S1108). Accordingly, the drone taxi may receive the card payment result signal from the landing transceiver device, and may land on the landing site.

FIG. 12 is a block diagram illustrating a fourth exemplary embodiment of a distributed packet including a specific trust field.

Referring to FIG. 12, a distributed packet may include a packet header field 1210, a source address field 1220, a destination address field 1230, an open trust field 1240, a data field 1250, and a CRC field 1260. Here, the packet header field 1210 may be a field for indicating a packet type. In this case, the packet type may be, for example, a card payment result packet. A landing site server may indicate that the distributed packet is a card payment result packet by using, for example, a hexadecimal value 0x0D in the packet header field 1210.

The source address field 1220 may be a field for indicating a source address of the distributed packet. The landing site server may transmit the distributed packet by designating its own identifier (ID) in the source address field 1220. The destination address field 1230 may be a field for indicating a destination address of the distributed packet. The landing site server may transmit the distributed packet by designating the destination address in the destination address field 1230. The landing site server may transmit the disturbed packet, for example, by designating an identifier of a drone taxi. In addition, the open trust field 1240 may be a field that allows trustworthiness of the distributed packet to be confirmed through a trusted authority designated by a wireless distributed communication system.

Meanwhile, the data field 1250 may include a card payment result parsing block 1251 and a general data field 1252. Here, the card payment result parsing block 1251 may be a parsing block related to a card payment result. The card payment result parsing block 1251 may include a parsing header field 1251-1, a card payment result field 1251-2, a specific bit generation time field 1251-3, and a specific trust field 1251-4. Here, the parsing header field 1251-1 may be for indicating a property of information included in the card payment result parsing block 1251.

The landing site server may provide a card payment result through the card payment result field 1251-2 continued by using, for example, a hexadecimal value 0x09 in the parsing header field 1251-1, may provide information on a generation time of specific trust bits through specific bit generation time field 1251-2, and may provide the specific trust bits through the specific trust field 1251-3. Here, the card payment result field 1251-2 may be used to inform the card payment result.

The landing site server may transmit the distributed packet by including information related to the card payment result (e.g., card number, payment time, payment amount, and fee) in the card payment field 1251-2. Here, the information related to the card payment result may include data generated as a result of the payment operation such as card points generated due to the payment.

The specific bit generation time field 1251-3 may be a field for indicating the time at which the specific bits are generated. The specific bit generation time field 1251-3 may include a generation time when the specific bits were generated in the card company server. The specific trust field 1251-3 may refer to a field inserted into the packet so that a mutual trustworthiness check can be performed between any two specific terminals in wireless distributed communication.

The specific trust field 1251-4 may include specific trust bits generated by the card company server. Here, the card company server may generate the specific trust bits by using the card company code and the secret key. Alternatively, the card company server may generate the specific trust field by using the card company code, the drone taxi identifier, and the secret key. Alternatively, the card company server may generate the specific trust field by using the card company code, the drone taxi identifier, the transmission time (i.e., specific bits generation time), and the secret key.

The landing site server may receive the specific trust bits from the card company server. In addition, the landing site server may transmit the received specific trust bits to the drone taxi by including the received specific trust bits in the specific trust field 1251-3. The general data field 1252 may include data that the landing server needs to transmit. The CRC field 1260 may designate a CRC to determine whether the distributed packet has an error.

On the other hand, the card company server may notify the landing site server of a card payment failure when the card payment fails as a result of performing the card payment. In this case, the card company server may inform a reason for the card payment failure. Then, the landing site server may notify the drone taxi of the card payment failure, and may inform the reason for the card payment failure.

Meanwhile, in a synchronous wireless distributed communication scheme, a first terminal (e.g., drone, drone taxi) may not transmit a generation time of specific trust bits to a third terminal (e.g., landing site server). A reason why the first terminal does not transmit the generation time of specific trust bits to the third terminal is because a time at which the specific trust bits are generated in the synchronous wireless distributed communication is promised to be a time of a transmission slot of the corresponding distributed packet.

Alternatively, in an asynchronous wireless distributed communication scheme, the first terminal may transmit the generation time of specific trust bits to the third terminal. In addition, the first terminal may randomly select the generation time of specific trust bits in order to increase security of the trust field. In this case, information of the randomly selected generation time may be included in the distribution packet together with the trust field.

Figure 13:
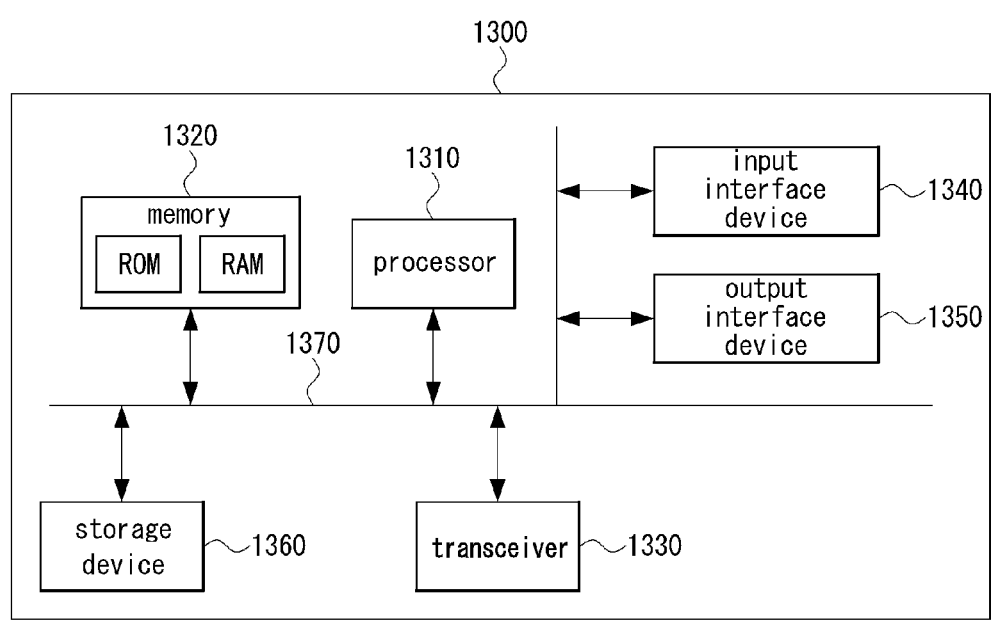
FIG. 13 is a block diagram illustrating an exemplary embodiment of a communication node constituting a communication system.

FIG. 13 is a block diagram illustrating an exemplary embodiment of a communication node constituting a communication system.

Referring to FIG. 13, a communication node 1300 may comprise at least one processor 1310, a memory 1320, and a transceiver 1330 connected to the network for performing communications. Also, the communication node 1300 may further comprise an input interface device 1340, an output interface device 1350, a storage device 1360, and the like. The respective components included in the communication node 1300 may communicate with each other as connected through a bus 1370.

However, the respective components included in the communication node 1300 may be connected to the processor 1310 via an individual interface or a separate bus, rather than the common bus 1370. For example, the processor 1310 may be connected to at least one of the memory 1320, the transceiver 1330, the input interface device 1340, the output interface device 1350, and the storage device 1360 via a dedicated interface.

The processor 1310 may execute a program stored in at least one of the memory 1320 and the storage device 1360. The processor 1310 may refer to a central processing unit (CPU), a graphics processing unit (GPU), or a dedicated processor on which methods in accordance with embodiments of the present disclosure are performed. Each of the memory 1320 and the storage device 1360 may be constituted by at least one of a volatile storage medium and a non-volatile storage medium. For example, the memory 1320 may comprise at least one of read-only memory (ROM) and random access memory (RAM). Here, the communication node 1300 may be the drone, the flight permission approval server, the nuclear power plant server, the obstacle device, the drone taxi, the landing site server, the drone company server, or the card company server.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first communication node in a wireless distributed communication system, the operation method comprising:
   providing a group code and a primary secret key to a third communication node via a second communication node;
   receiving, from the third communication node, a first packet including a first group trust field and first position information of the third communication node through wireless distributed communication, the first group trust field being generated using the group code and the primary secret key; and
   performing a trustworthiness check of the received first packet by using the first group trust field included in the received first packet, the group code, and the primary secret key,
   wherein the first position information is used to determine whether the third communication node is located in an entry restricted area.

2. The operation method according to claim 1, further comprising:
   determining whether the third communication node has located the entry restricted area based on the first position information; and
   in response to determining that the third communication node has-entered located the entry restricted area, permitting the third communication node to enter the entry restricted area when a trustworthiness of the first packet is confirmed.

3. The operation method according to claim 2, further comprising:
transmitting, to the third communication node, a signal prohibiting the third communication node to enter into the entry restricted area when the trustworthiness of the first packet is not confirmed as a result of the trustworthiness check; and
transmitting, to the second communication node, a signal prohibiting the third communication node to enter into the entry restricted area.

4. The operation method according to claim 1, further comprising:
generating a secondary secret key by updating the primary secret key;
providing the secondary secret key to the third communication node via the second communication node;
receiving, from the third communication node, a second packet including a second group trust field generated using the group code and the secondary secret key; and
performing a trustworthiness check of the received second packet by using the second group trust field included in the received second packet, the group code, and the secondary secret key.

5. The operation method according to claim 1, further comprising:
receiving, from the second communication node, a secondary secret key updated based on the primary secret key;
receiving, from the third communication node, a second packet including a second group trust field generated using the group code and the secondary secret key; and
performing a trustworthiness check on the received second packet by using the second group trust field included in the received second packet, the group code, and the secondary secret key.

6. The operation method according to claim 5, further comprising:
receiving, from the third communication node, second position information of the third communication node together with the second group trust field;
determining whether the third communication node has located the entry restricted area based on the second position information; and
in response to determining that the third communication node has located the entry restricted area, permitting the third communication node to enter the entry restricted area when a trustworthiness of the received second packet is confirmed.

7. The operation method according to claim 1, wherein the first group trust field is generated based on the group code and the primary secret key by using a linear feedback shift register in the third communication node.

* * * * *